(12) United States Patent
Shim et al.

(10) Patent No.: US 7,481,443 B2
(45) Date of Patent: Jan. 27, 2009

(54) VEHICLE WITH VARIABLE WHEEL CAMBER

(75) Inventors: S. Scott Shim, West Lafayette, IN (US); Matthew C. Grossman, Austin, TX (US); Ryan Lightbody, Bellevue, WA (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 11/417,684

(22) Filed: May 4, 2006

(65) Prior Publication Data

US 2007/0007745 A1      Jan. 11, 2007

Related U.S. Application Data

(60) Provisional application No. 60/680,917, filed on May 13, 2005, provisional application No. 60/678,072, filed on May 5, 2005.

(51) Int. Cl.
    *B62K 5/02*    (2006.01)
(52) U.S. Cl. .................................. 280/282; 280/86.751
(58) Field of Classification Search ................ 280/282, 280/259, 304.1, 250.1, 86.751, 5.521
    See application file for complete search history.

(56) References Cited

U.S. PATENT DOCUMENTS

| | | | |
|---|---|---|---|
| 3,001,601 A | | 9/1961 | Aghnides |
| 3,014,547 A | | 12/1961 | Van Der Lely |
| 3,765,466 A | | 10/1973 | Tsuruta |
| 3,799,565 A | | 3/1974 | Burtis et al. |
| 3,937,486 A | | 2/1976 | Weiters |
| 4,046,212 A | * | 9/1977 | Hansen ........................ 180/254 |
| 4,360,224 A | * | 11/1982 | Sato et al. .................... 280/269 |
| 4,497,502 A | | 2/1985 | Forbes et al. |

(Continued)

FOREIGN PATENT DOCUMENTS

DE        708500        5/1954

(Continued)

OTHER PUBLICATIONS

Access Center Spoke Shop, Action Top End Eliminator™, [online], © 2000, [retrieved on Nov. 30, 2005]. Retrieved from the Internet: <http://www.spokeshopsd.org/top_end_eliminator_racing_chair.htm> (1 pg).

(Continued)

*Primary Examiner*—Tony H. Winner
(74) *Attorney, Agent, or Firm*—Ice Miller LLP; Thomas Walsh; David B. Quick

(57) ABSTRACT

A tricycle convertible to a bicycle. The tricycle has a first wheel rotatably mounted on one end portion of a frame, and a pair of laterally spaced wheels rotatably mounted on a second end portion of the frame, wherein the laterally spaced wheels are movable, while the tricycle is in motion, between a first position with relatively wide ground-level spacing and a second position with minimal ground-level spacing. A wheel hub capable of providing adjustable wheel camber has left and right pivotally mounted axles extending laterally from the hub body, the axles each adapted to support a wheel and mounted so as to pivot vertically, and a dual camber control mechanism coupled to the axles and adapted to provide coordinated camber adjustment in the same direction for wheels on both axles. The hub has sufficient range of motion to allow the wheels to change from negative camber to positive camber, and is useful in a method of stabilizing a bicycle or the like to increase safety during rider training. The method involves a tricycle mode of operation in which the laterally spaced wheels have negative camber, and a bicycle mode of operation in which the laterally spaced wheels have positive camber, with a change from tricycle mode to bicycle mode while in motion, whereby a rider in training may start moving with stable three-point ground contact and, when in motion and balanced, effectively start riding a bicycle.

8 Claims, 5 Drawing Sheets

U.S. PATENT DOCUMENTS

| | | | |
|---|---|---|---|
| 4,526,392 A | 7/1985 | Berkstresser | |
| 4,541,501 A | 9/1985 | Kawasaki | |
| 4,592,570 A | 6/1986 | Nassiri | |
| 4,634,137 A | 1/1987 | Cocksedge | |
| 4,789,173 A | 12/1988 | Lofgren et al. | |
| 4,835,714 A * | 5/1989 | Sano et al. | 700/279 |
| 4,887,829 A | 12/1989 | Prince | |
| 4,903,857 A | 2/1990 | Klopfenstein | |
| 5,181,740 A | 1/1993 | Horn | |
| 5,240,267 A | 8/1993 | Owsen | |
| 5,480,172 A | 1/1996 | James | |
| D369,330 S | 4/1996 | Hill et al. | |
| 5,611,555 A | 3/1997 | Vidal | |
| 5,762,351 A | 6/1998 | SooHoo | |
| 5,769,441 A | 6/1998 | Namngani | |
| D430,070 S | 8/2000 | Kciuk | |
| 6,220,612 B1 | 4/2001 | Beleski, Jr. | |
| 6,367,824 B1 | 4/2002 | Hayashi | |
| 6,817,617 B2 | 11/2004 | Hayashi | |
| D503,662 S | 4/2005 | Tiyawatchalapong | |
| 6,874,793 B2 * | 4/2005 | Choudhery | 280/5.521 |
| 6,932,370 B2 * | 8/2005 | Jones et al. | 280/282 |
| 6,988,741 B2 * | 1/2006 | Borochov et al. | 280/282 |
| 2002/0163163 A1 | 11/2002 | Shapiro | |
| 2003/0011157 A1 * | 1/2003 | Aubarede et al. | 280/86.751 |
| 2003/0034635 A1 * | 2/2003 | Ludovici | 280/647 |

FOREIGN PATENT DOCUMENTS

| | | |
|---|---|---|
| DE | 19935567 | 2/2001 |
| DE | 19935334 | 3/2001 |
| DE | 2374327 | 10/2002 |
| DE | 10330894 | 2/2005 |
| GB | 2380982 | 4/2003 |
| JP | 01182105 A | 7/1989 |

OTHER PUBLICATIONS

Invacare® Top End ® Eliminator™ OSR Racing Chair, [online],201 2005, [retrieved on Dec. 1, 2005]. Retrieved from the Internet: http://www.invacare.com/product_files/G2001_192B.pdf (2 pgs).

Douglas, Andrew B., *hellbent ST20*, "*Sleek US trike offering*," [online], [retrieved on May 4, 2006]. Retrieved from the Internet: http://www.bentrideronline.com/2004Feb/hellbentst20.htm (7 pages).

* cited by examiner

VEHICLE WITH VARIABLE WHEEL CAMBER

CROSS-REFERENCE TO RELATED APPLICATIONS

This application claims the benefit of U.S. Provisional Patent Application Ser. Nos. 60/678,072, filed May 5, 2005, and 60/680,917, filed May 13, 2005.

BACKGROUND OF THE INVENTION

The present invention relates to bicycles and other human-powered and motorized wheeled vehicles, and more particularly to devices for helping people learn to ride a bicycle or other wheeled vehicle which requires balance for stable operation.

The traditional process of learning to ride a bicycle is frightening and can be painful, and the process has not changed over the years. Typically a child gets assistance from a parent who pushes the child on a bike, runs alongside and then lets go, hoping that the child will gain balance before falling over. The learning curve during this process is very steep.

Conventional tricycles are well known for use by children not ready to begin learning to ride a bike, and training wheels are well known accessories for children's bicycles. However, there remains a need for devices to make the process of learning to ride a bike safer and enjoyable, and to make the process part of the goal itself, with the result of a more positive experience for parent and child alike.

SUMMARY OF THE INVENTION

The present invention has various aspects but is particularly well suited to helping children learn how to ride a bike on their own. Unlike traditional training wheels, that simply prevent the bike from tipping, the present invention allows children to learn how to balance themselves gradually, and thereby allows them to learn at their own pace. According to one aspect of the present invention, a pair of laterally spaced wheels on the frame of a bicycle or other wheeled vehicle have variable camber allowing a predetermined negative camber on the wheels in order to provide a stable starting platform with the wheels spaced apart at ground level, while allowing adjustment of camber of both wheels in the positive direction so as to decrease the distance between the wheels at ground level while the vehicle is moving.

According to another aspect of the present invention, a wheeled vehicle with adjustable wheel camber comprises at least one wheel rotatably mounted on one end portion of a frame, and a pair of laterally spaced wheels rotatably mounted on a second end portion of the frame, wherein the laterally spaced wheels are pivotally mounted such that the camber of each is adjustable in the same direction as the other, e.g., both wheels changing from negative camber to positive camber, and wherein the camber is adjustable with the vehicle in motion.

Another aspect of the present invention is a wheel hub capable of providing adjustable wheel camber. A hub body has left and right axles extending laterally therefrom, at least one axle being pivotally mounted, and the hub includes a camber control mechanism coupled at least to the one axle and adapted to adjust the angle thereof with respect to the other axle.

The present invention also provides a novel method of learning to ride a bicycle or the like. The method comprise mounting a wheeled vehicle having a seat on a frame with at least one wheel on one end and a pair of laterally spaced wheels on a second end, beginning to ride with a predetermined negative camber on both laterally spaced wheels providing a stable starting platform with the wheels spaced apart at ground level, and thereafter adjusting camber of both laterally spaced wheels in the positive direction so as to decrease the distance between the laterally spaced wheels at ground level.

Another aspect of the invention is a method of stabilizing a bicycle or the like to increase safety during rider training. The method comprises providing first and second laterally spaced wheels on one end of a frame having at least one other wheel attached thereto so as to provide at least three-point ground contact in at least one mode of operation, providing a tricycle mode of operation in which at least the first laterally spaced wheel has negative camber, and providing a bicycle mode of operation in which the first laterally spaced wheel has positive camber and minimal ground spacing from the second laterally spaced wheel. The method further comprises enabling a change from the tricycle mode of operation to the bicycle mode of operation while in motion, whereby a rider in training may start moving with stable three-point ground contact and, when in motion and balanced, effectively start riding a bicycle.

The present invention also provides a tricycle convertible to a bicycle. The tricycle has a first wheel rotatably mounted on one end portion of a frame, and a pair of laterally spaced wheels rotatably mounted on a second end portion of the frame, wherein the laterally spaced wheels are movable between a first position with relatively wide ground-level spacing and a second position with minimal ground-level spacing.

The objects and advantages of the present invention will be more apparent upon reading the following detailed description in conjunction with the accompanying drawings.

DESCRIPTION OF PREFERRED EMBODIMENTS

Figure 1:
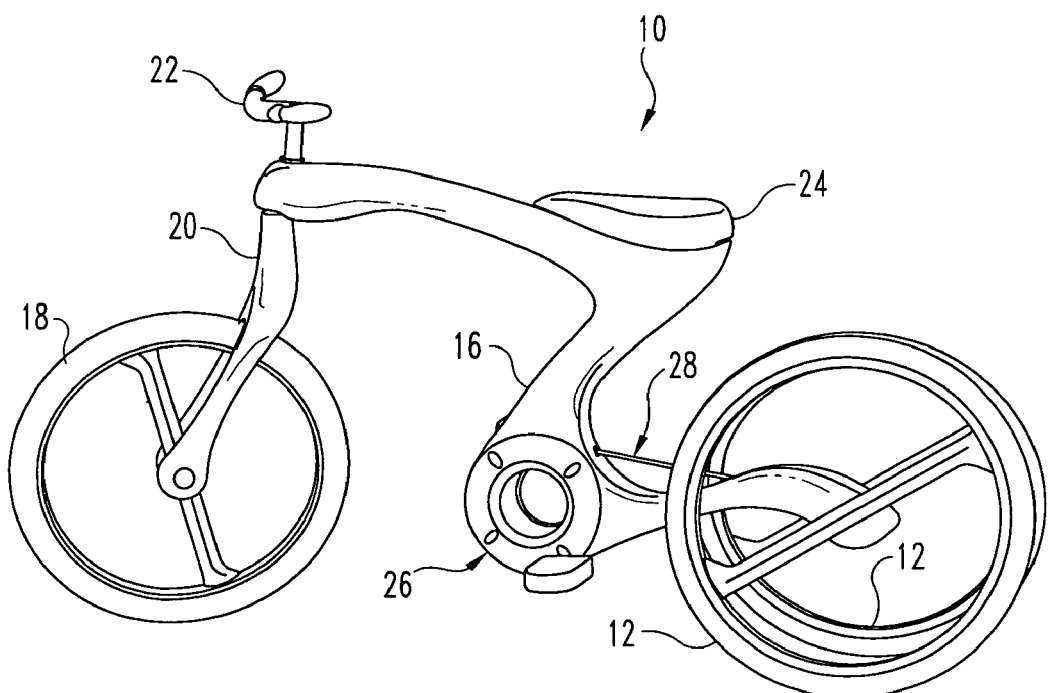
FIG. 1 is a side view of one embodiment of a tricycle according to the present invention.

For the purpose of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices and such further applications of the principles of the invention as illustrated therein being contemplated as would normally occur to one skilled in the art to which the invention relates.

Figure 2:
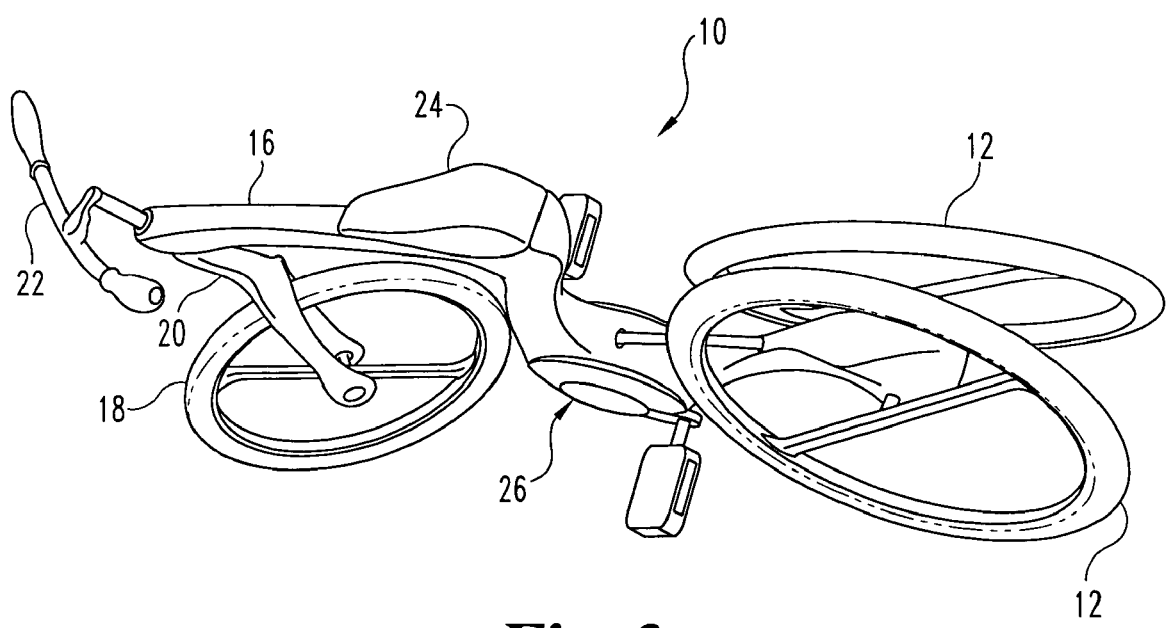
FIG. 2 is a top, rear perspective view of the tricycle of FIG. 1.

FIGS. 1 and 2 illustrate a first embodiment of the present invention in the form of a tricycle 10 having a pair of variable-camber wheels 12 rotatably mounted on the rear end of a generally Z-shaped frame 16. The disclosed tricycle also includes a front wheel 18 mounted in a fork 20 which is controlled by a handlebar 22 in a conventional manner, as well as a saddle 24, a crankset 26, and a partially internal belt drive 28 interconnecting the crankset and a freewheel in the hub which will be described further below.

Figure 3A:
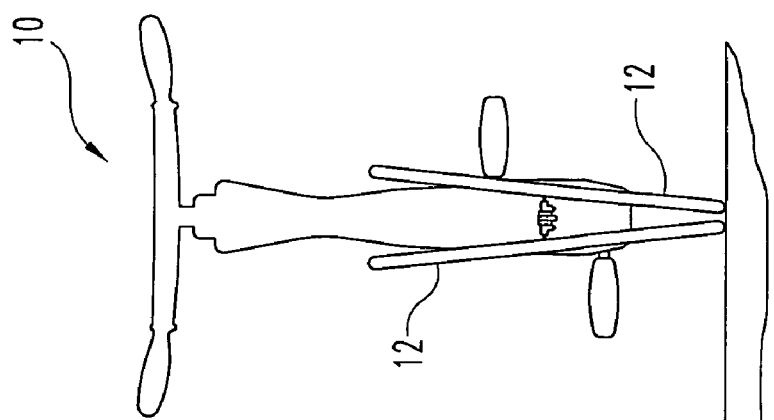
FIG. 3A is a rear view of the same tricycle showing the rear wheels with negative camber as desired to provide a stable starting platform for a rider.
Figure 3B:
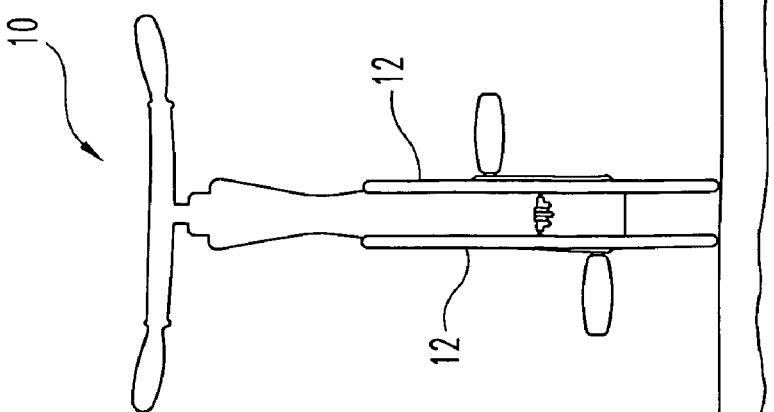
FIG. 3B is a rear view of the same tricycle showing the rear wheels with zero camber.
Figure 3C:
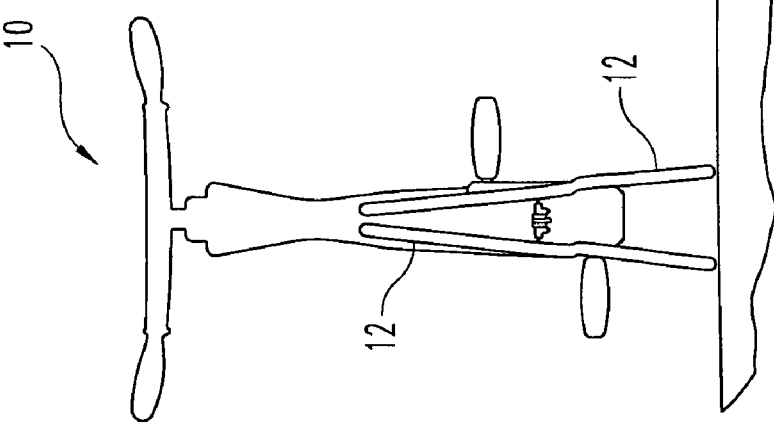
FIG. 3C is a rear view of the same tricycle showing the rear wheels with positive camber effectively creating a bicycle mode of operation.

FIGS. 3A-3C show the tricycle in different states or modes of operation including a tricycle mode in which both rear wheels have negative camber, as shown in FIG. 3A, and a bicycle mode in which both rear wheels have positive camber, as shown in FIG. 3C. It will be understood by those skilled in the art that camber angle is the angle of the plane of each rear wheel with respect to vertical. Inward tilt of the top of the wheel, that is, toward the centerline of the vehicle, is called negative camber; outward tilt is called positive camber. Due to the degree of its variable camber and the rear wheel spacing, the disclosed embodiment of the invention is effectively a tricycle convertible to a bicycle.

Unlike traditional training wheels, which simply prevent a bike from tipping over, the disclosed tricycle allows children to learn how to balance on their own. The variable-camber wheels help balance the bike at rest and at low speeds by virtue of being spread apart at ground level as shown in FIG. 3A, i.e., a tricycle mode of operation. As the rider builds up forward momentum and shifts his weight forward in the process, the wheels shift inwardly due to decreased weight on the rear wheels, as explained below, thus causing the balance to gradually shift from the bicycle to the rider. The tricycle provides more balance at lower speeds when stability is most critical (starting and stopping), by providing a larger stance, and allows the rider to transition into the bicycle mode of operation while in motion.

Figure 4:
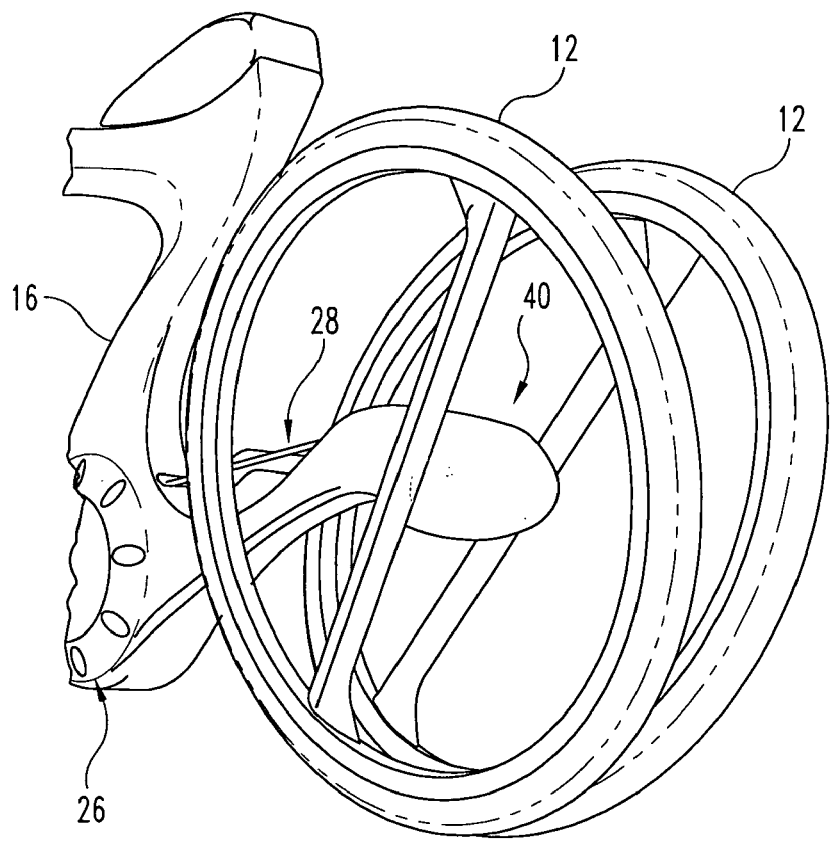
FIG. 4 is a left, rear perspective view of the tricycle showing the rear end of the frame and a swinging hub therein.
Figure 5:
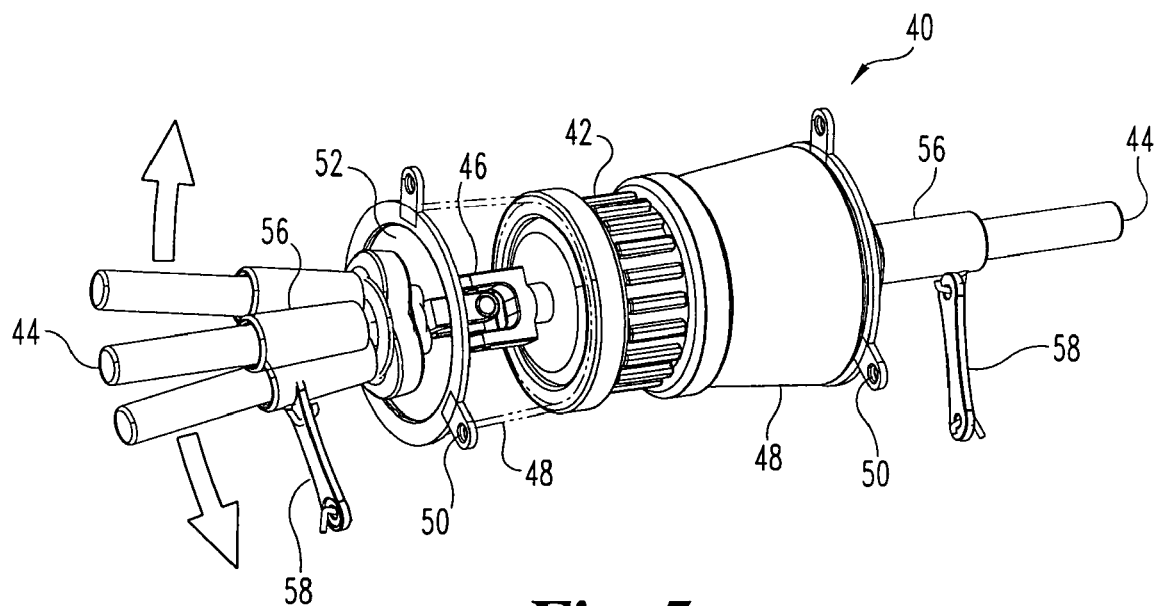
FIGS. 5-7 are more detailed views of the swinging hub.
Figure 6:
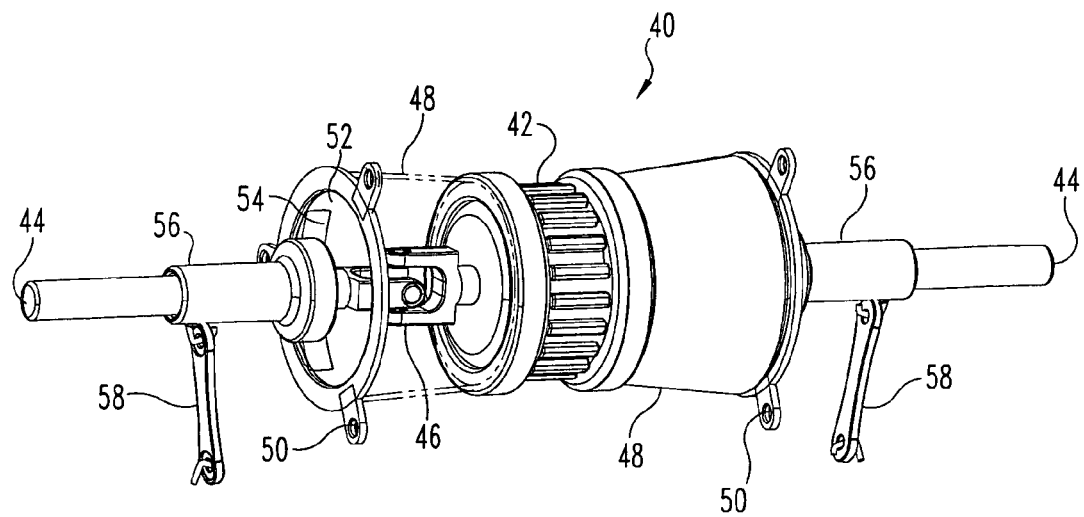
Figure 7:
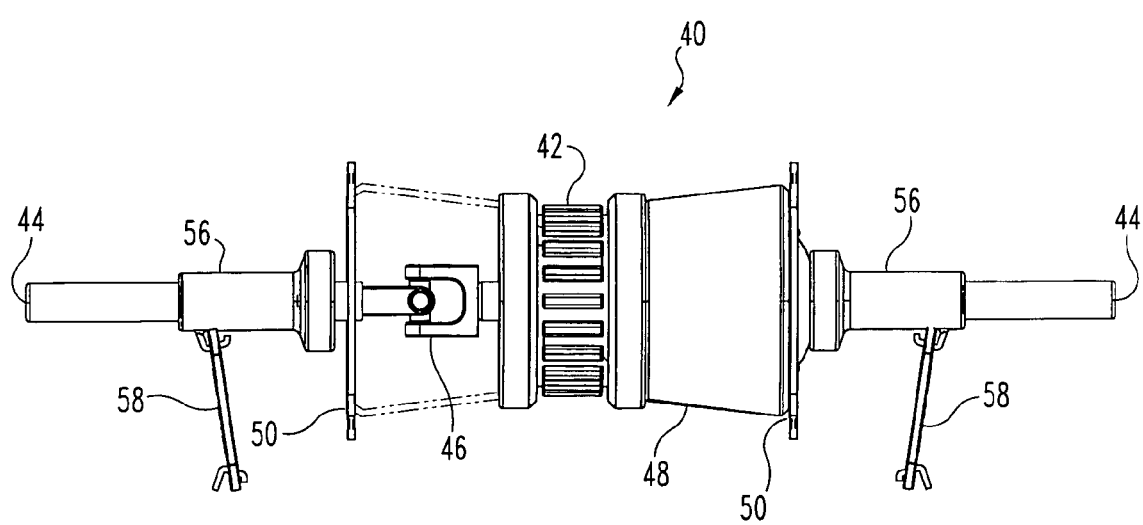

Referring to FIG. 4, the tricycle has a swinging rear hub 40 which allows the rear wheels to tilt in and out and thereby provide a larger or smaller stance, i.e., ground level spacing. FIGS. 5-7 show one embodiment of a swinging hub which has a centrally located freewheel 42 rotatably coupled to two axles 44 through respective universal joints 46 which are located within frustoconical or cup-shaped hub sections 48 (shown as translucent in the drawing). A flexible shaft or other means for transmitting power between non-coaxial axles may be employed in place of a U-joint. A mounting bracket 50 on each side supports the hub in the frame, and each lateral hub section has sufficient free space therein to allow pivoting of the associated axle. The axle is preferably constrained to allow only vertical pivoting, e.g., by means of a slotted member 52 having a vertical slot 54 engaging the axle or the collar 56 which surrounds the axle. A flexible rubber boot may be provided around the collar to seal the opening in the hub or as a dust cover. The collar is biased downwardly by a tension band 58 as one form of a camber control mechanism. The tension band is removably attached to the collar on one end and to a hook on the other end, the hook being provided on a portion of the frame below the collar. Alternatively, a single tension band may extend underneath the frame and interconnect the two collars. A bicycle wheel 12 is nonrotatably mounted on each axle in a conventional manner.

The rear wheel axles may be spring-biased instead of biased by tension bands. For example, a vertically oriented compression spring may be included above each axle in the hub, e.g., in or adjacent to slot 54 and oriented to apply downward force to an inboard portion of the collar.

Figure 8:
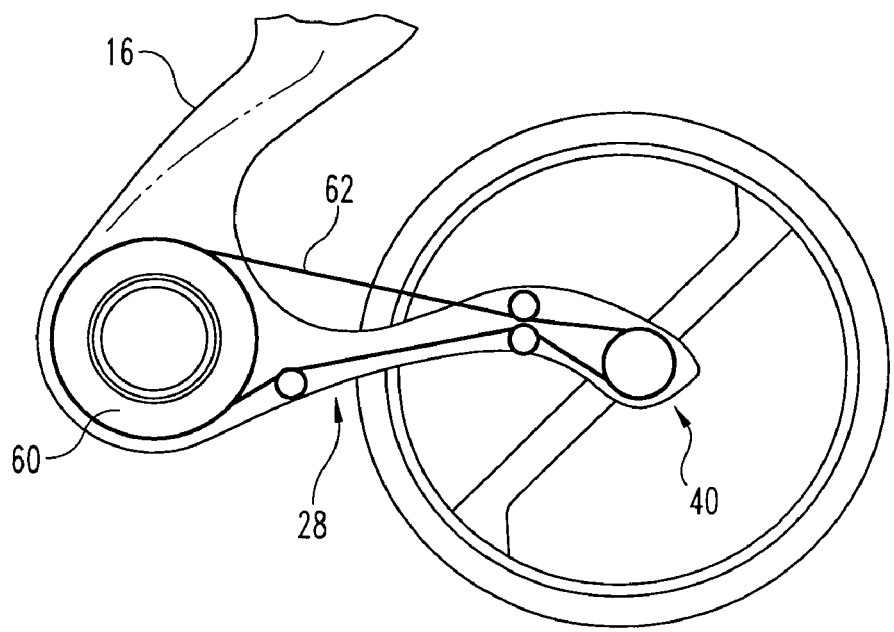
FIG. 8 is a cross-section of part of the tricycle showing a belt drive.

Turning to FIG. 8, the tricycle may have a conventional bottom bracket and a conventional crankset with pedals on the ends of crank arms, but, in the illustrated embodiment, the pedals are each mounted on a ring with radius essentially equal to a desired crank arm length. The hollow bottom bracket 60 effectively combines the functions of the conventional crankset axle and crank arms, and also serves as the front drive pulley for the drive belt 62, which interconnects that pulley and the freewheel and thereby transmits power from the crank to the rear wheels. The partially internal belt keeps the drive train away from the rider, and thereby helps prevent possible injury; its external portion may be covered with a guard similar to a conventional bicycle chain guard if desired.

One embodiment of a tricycle according to the present invention has an aluminum monocoque frame design, with the frame and fork both made from 7160 aluminum and TIG welding. As one example set of dimensions, the tricycle may have a length of 60", width (at widest point) of 24", height of 35", and weight of 25 lbs. Each rear axle may, for example, be approximately 5" in length and have a 1" diameter, and the overall width of the hub may be approximately 5". Other frame materials are also contemplated, including steel, carbon fiber, plastic and titanium.

Figure 9:
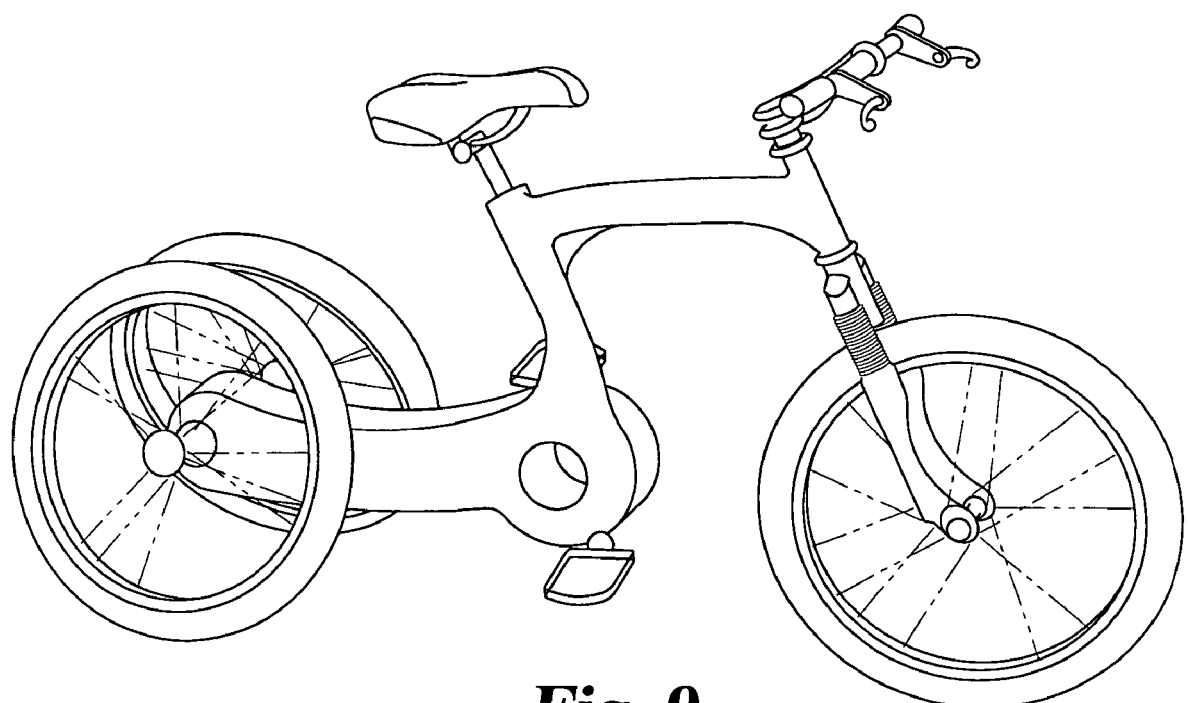
FIG. 9 is a photograph of another embodiment of a tricycle incorporating principles of the present invention.

FIG. 9 shows another embodiment of a tricycle incorporating principles of the present invention. Other embodiments are also contemplated, including embodiments in which the wheel camber is adjusted as a function of speed or other parameters, either instead of or in addition to weight-responsive adjustment. For example, a speed sensor may provide an output to a suitable control circuit and actuator to adjust the angle of each rear axle.

Alternatively, the tricycle may have a manual camber adjustment mechanism, such as a release lever coupled, e.g., by a control cable, to a catch or trigger mechanism in the hub which holds the wheels in the stable negative camber position. A rider may use the release lever to release the rear axles from the catch, whereby the downwardly biased axles shift to an angle below horizontal and thereby shift the wheels to positive camber. A similar mechanical shift mechanism may operate according to the principles of a cable-driven derailleur.

The illustrated tricycle was primarily designed to benefit two categories of users. First, it provides a less challenging and less threatening design solution. The design solution also takes away the fear in learning how to ride a bike. The child feels more self-confident and is more self-reliant during the learning process, which increases the enjoyment of the experience. The tricycle is also easy to use and can be used without having to go through special training or instruction. Secondly, the tricycle also benefits parents in many ways. Parents feel more secure about their children learning how to ride a bike, since it lessens the chance that injury will occur. Parents also do not risk losing the trust of their children as might occur if a crash occurs after a parent pushes a child off. The child is also safer due to the unexposed drive train and easy-to-use operation, which allows the parent to let the child learn on his own, and not have to constantly monitor his safety. The parents also benefit from the tricycle's ease of maintenance and easy replacement of parts.

The present invention is not limited to the training years such as traditional training wheels. It can be used well into the adolescent years and beyond, including the retirement years.

The protected drive train helps improve durability therefore reducing the amount of maintenance and replacement parts that are needed. A tricycle in accordance with this invention also makes learning how to ride a bicycle fun, which, along with the added enjoyment of using the tricycle beyond the learning years, should encourage the child to use a bicycle in the future. This future use as both recreation and transportation is environmentally sound and helps promote environmental responsibility.

While the invention has been illustrated and described in detail in the drawings and foregoing description, the same is to be considered as illustrative and not restrictive in character, it being understood that only preferred embodiments have been shown and described and that all changes and modifications that come within the spirit of the invention are desired to be protected. For example, the invention may be embodied in a tandem and/or recumbent tricycle or bicycle. Engine power such as on a motorcycle is also contemplated as an alternative to human power, or in addition thereto, for certain applications. In addition, the principles of the invention may also be useful in certain applications with vehicles having more than three wheels, such as four-wheel bicycle-like surreys or carriages modified in accordance with the present invention such that the camber of each wheel in the front wheelset or rear wheelset is adjustable in the same direction, or the camber of both front and rear wheelsets is adjustable in the same direction to effectively obtain two-wheel operation.

Fork mounting of a hub and wheelset according to the present invention is also contemplated, as is application of the invention to mountain bikes and other vehicles having front and/or rear shock absorbers or suspensions, suspension seat posts, conventional spoked wheels, wheel fenders, and upright and drop handlebars with a substantial rearward curve.

We claim:

1. A wheeled vehicle with an adjustable wheel camber, comprising:
    a frame;
    at least one wheel rotatably mounted on one end portion of said frame; and
    a pair of laterally spaced wheels rotatably mounted on a second end portion of said frame, wherein said laterally spaced wheels are pivotally mounted such that the camber of each is adjustable in the same direction as the other;
    wherein there is a pair of laterally spaced wheels rotatably mounted on each end portion of said frame
    wherein the camber is adjustable with said vehicle in motion, and
    wherein the camber of said rear wheels is adjustable between positive camber and negative camber; and,
    wherein said rear wheels are sufficiently closely spaced that the bottoms of said rear wheels nearly touch each other in a state of maximum positive camber.

2. A hub providing adjustable wheel camber on a wheeled vehicle, comprising:
    a hub body;
    left and right axles extending laterally from said hub body, said axles each adapted to support a wheel, at least one of said axles mounted so as to pivot vertically, wherein said left and right axles are both pivotally mounted to said hub body;
    a camber control mechanism coupled to said at least one axle and adapted to adjust the angle thereof with respect to the other axle;
    wherein said camber control mechanism is a dual control mechanism coupled to both of said axles and adapted to provide coordinated camber adjustment in the same direction for wheels on both axles and said camber control mechanism includes left and right collars around said left and right axles, respectively and
    further comprising a center axle in said hub body, and left and right U-joints connecting said center axle to said left and right axles, respectively.

3. The hub of claim 2, wherein said camber control mechanism is capable of adjusting camber with the vehicle in motion.

4. The hub of claim 3, further comprising a drive sprocket mounted on said center axle for transmitting power thereto from a crankset via a flexible drive member.

5. The hub of claim 4, wherein the wheel camber is adjustable between positive camber and negative camber.

6. The hub of claim 5, wherein said left and right axles are sized with respect to the wheels to be supported thereon so as to pivot vertically between a first position corresponding to maximum negative camber in which the tops of the wheels nearly touch each other during use, and a second position corresponding to maximum positive camber in which the bottoms of the wheels nearly touch each other during use.

7. The hub of claim 6, wherein said hub body is adapted to fit the rear end of a bicycle frame.

8. The hub of claim 7, wherein said camber control mechanism includes means for biasing said left and right axles downwardly.

* * * * *